Nov. 2, 1937.  C. W. ABBOTT ET AL  2,097,993
ELECTRIC WIRING SUPPORT
Filed Dec. 15, 1934   3 Sheets-Sheet 3
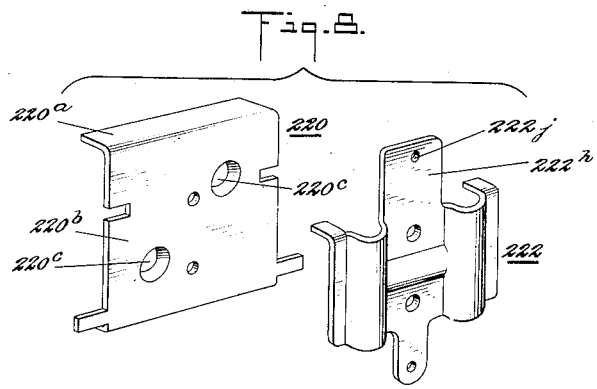
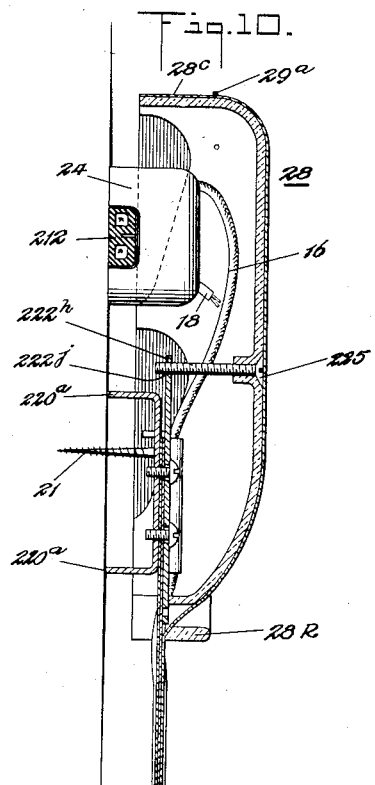
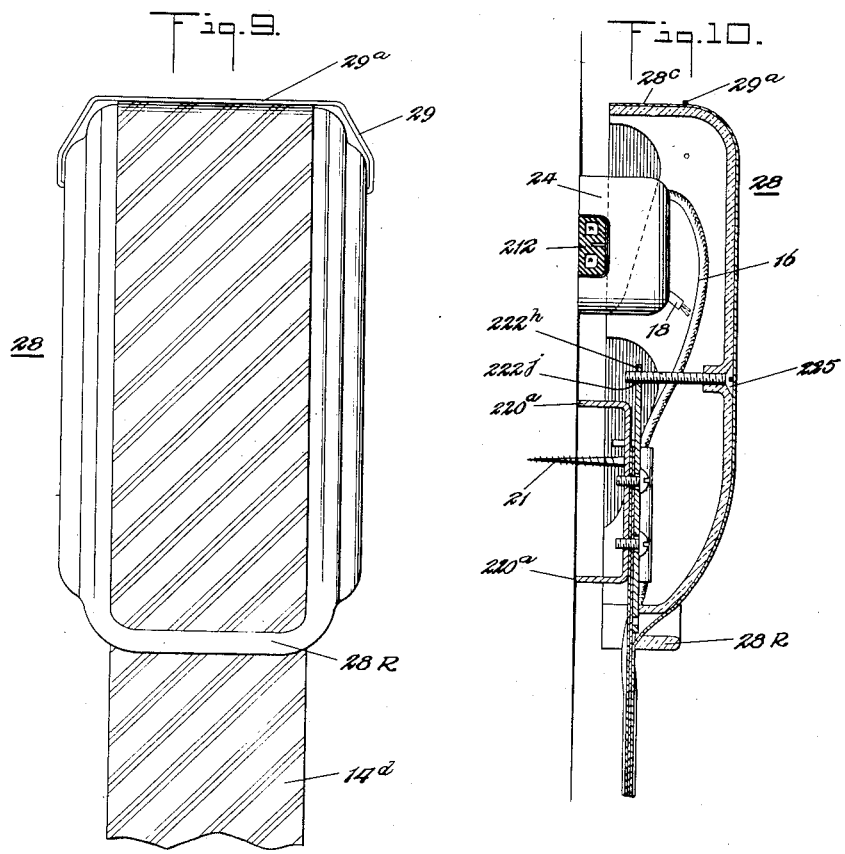
INVENTORS
CHARLES W. ABBOTT
GEORGE A. JOHNSON
BY THEIR ATTORNEYS
Howson and Howson Patented Nov. 2, 1937

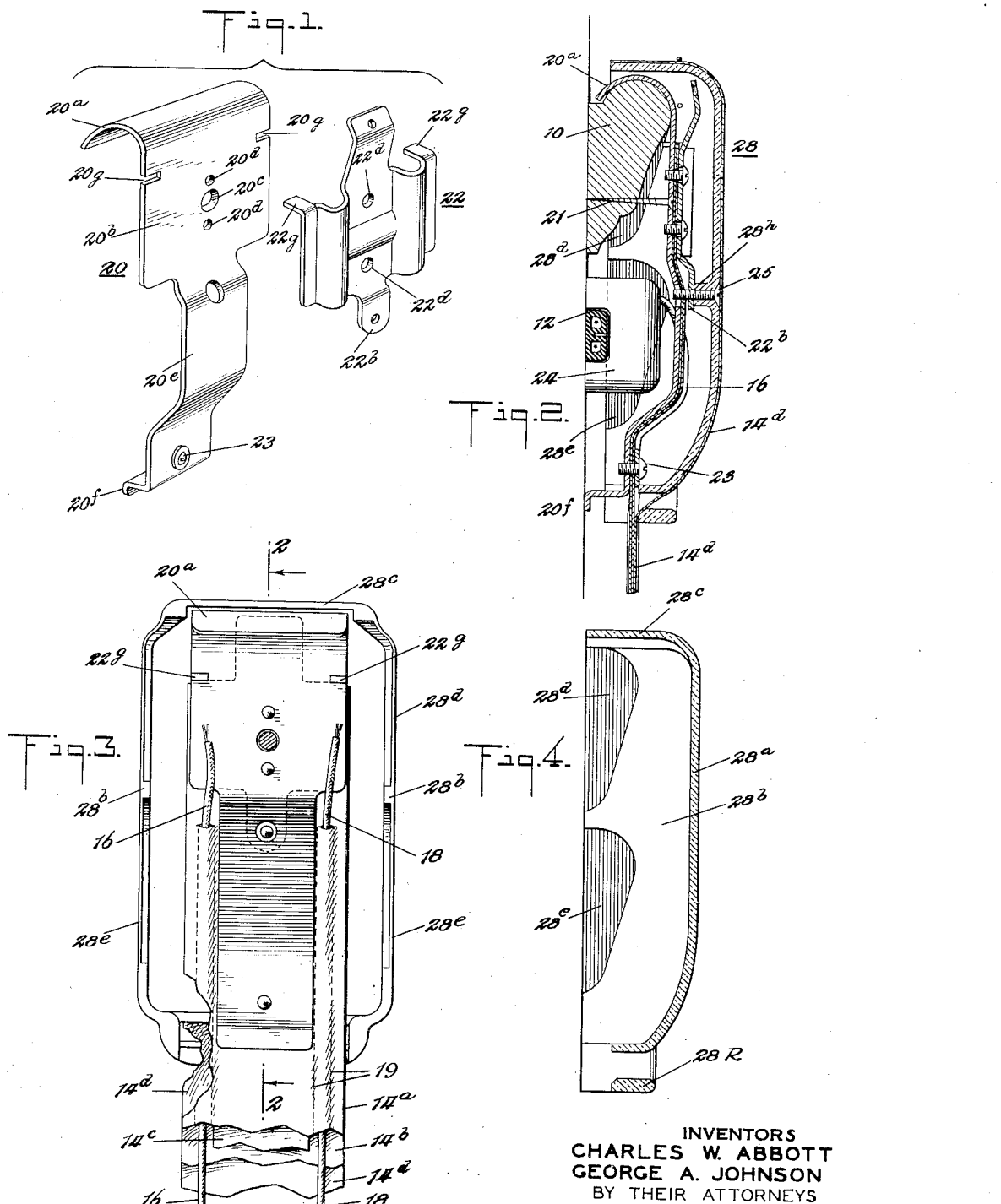

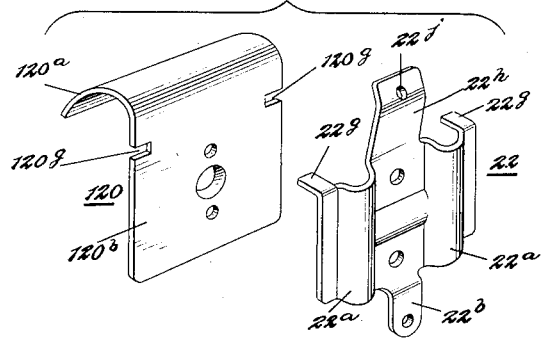
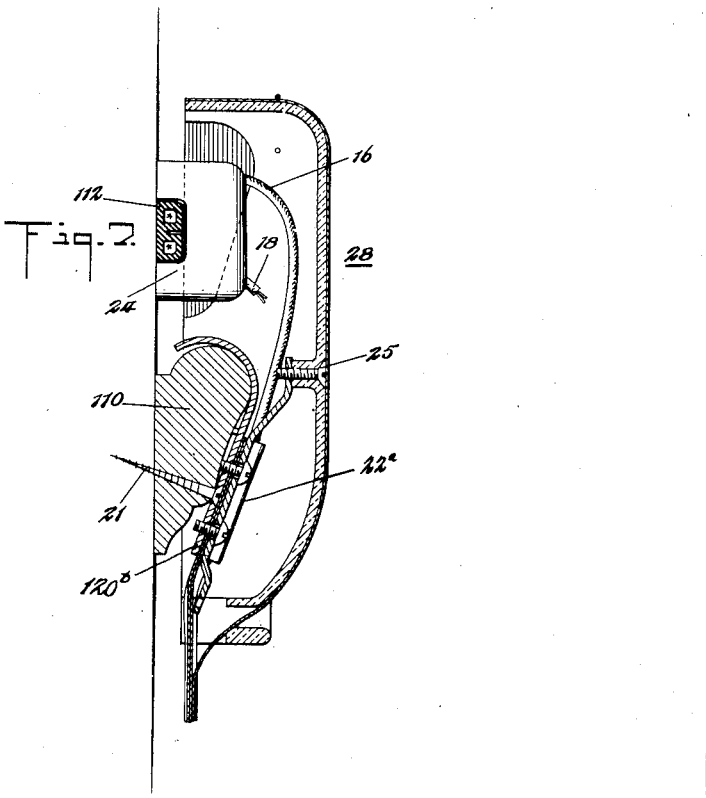

2,097,993

UNITED STATES PATENT OFFICE 2,097,993

ELECTRIC WIRING SUPPORT

Charles W. Abbott, Larchmont, N. Y., and George A. Johnson, Trumbull, Conn., assignors, by mesne assignments, to said Charles W. Abbott Application December 15, 1934, Serial No. 757,718

14 Claims. (Cl. 247—1)

This invention relates to supporting means for hanging conductors of surface wiring systems. More particularly it relates to supporting means for the fabric type of hanging conductors of surface wiring systems, on the lower end of which is a receptacle or a fixture or other similar electric wiring device. These supports are adapted to be used with the type of surface electric wiring shown in the copending applications of C. W. Abbott, Serial No. 571,962, patented December 18th, 1934, No. 1,984,355 and Serial No. 580,111, patented December 18th, 1934, No. 1,984,356.

In the type of wiring described in the above mentioned co-pending applications it is desirable to have any strain which may be incident to the pulling of a pendant conductor taken up by the fabric under which the conductors are encased.

It is therefore an object of our invention to provide an improved support for a hanging conductor by which the strain applied to the conductor may be taken by the fabric of the conductor and transmitted to a molding or wall in order to relieve all other parts of the wiring of such strain.

Another object of our invention is to provide a cover which will serve both to protect a wiring support and as an ornament more pleasing to the eye than the support itself.

In some cases, the surface wiring is placed above the picture molding and in some places the wiring is placed below the picture molding while in some other places, no molding is present and the wiring is led around the room on some convenient line, preferably adjacent the ceiling.

Thus another object of our invention is to provide supports for a hanging conductor, that is connected to the electric wiring where said wiring runs above or below the picture molding or where no molding is present.

Another object of our invention is to provide an ornamental and protecting cover for such supports, which cover may be used interchangeably with any one of said supports.

Another object of our invention is to provide supports for the various conditions of electric wiring above mentioned, which supports will require in their fabrication a minimum amount of material and tools.

In surface wiring of the above type when a pendant conductor is to be connected to a conduit a junction fitting or tap connection is customarily provided to afford a quick means for connecting the pendant conductor to the main conduit and to protect the joint after said connection is made.

Thus, another object of our invention is to provide supporting fittings which will cooperate with the junction fitting or tap connection fitting in such a way that both said fittings may be housed beneath the ornamental and protective cover.

Another object of our invention is to provide a protecting cover which will accommodate the junction fitting and each of the various types of supporting fittings which it may be desirable to use with the various conditions of surface wiring hereinbefore mentioned.

Other objects and advantages of our invention will become apparent as it is described in connection with the accompanying drawings:—

In the drawings:—

Figure 1 is an exploded perspective view of a support and clamp formed according to the principles of our invention and adapted for use with a surface wiring conduit running parallel and beneath a picture molding.

Figure 2 is a longitudinal section view taken through the clamp and support shown in Figure 1 when said clamp and support are assembled with a hanging conductor of the type hereinbefore mentioned and with a junction connection, all of which parts are protected by the ornamental and protective cover of our invention, the section being taken along line 2—2 of Figure 3.

Figure 3 is a rear view of the form of our invention shown in Figure 2.

Figure 4 is a longitudinal section view of the cover used in our invention, the section being taken along line 2—2 of Figure 3.

Figure 5 is an exploded perspective view of another form of support and clamp of a type used when the electric wiring conduit runs parallel to and above the picture molding.

Figure 6 is a perspective view of the clamp and support shown in Figure 5, when assembled with a pendant conductor and ready for connection to the wiring conduit.

Figure 7 is a longitudinal section view similar to Figure 2 but of the form of invention shown in Figures 5 and 6.

Figure 8 is an exploded perspective view of a clamp and support used with a surface electric wiring conduit when no picture molding is present.

Figure 9 is a front elevation view of the cover and pendant fabric as it appears when the invention is fully assembled and when a picture molding is not present.

Figure 10 is a longitudinal section view similar to Figures 2 and 7 but of the form of our invention shown in Figure 8.

Referring to the drawings and particularly to the form of the invention shown in Figures 1, 2 and 3, it will be seen that the picture molding 10 which is customarily attached to the wall of a room at or near the ceiling has below it and running parallel to it an electric wiring conduit 12 of the type shown in the copending application hereinbefore mentioned, Serial No. 571,962 of C. W. Abbott. At the point in this wiring conduit 12 where it is desired to make a tap connection for a pendant conductor, there may be connected a junction fitting 24 like or similar to that shown in application Serial No. 571,962, and the wires of the pendant conductor joined to the wires of the conduit through this junction connection.

An illustrative fabric conductor of the type with which our invention is designed for use, is shown in application Serial No. 571,962. This type of conductor may comprise two strips of fabric 14a and 14b between which are parallel conducting wires 16 and 18 which are held in position by stitching 19 adjacent each side of the conductors. If desired, a heavier strip of fabric 14c may be positioned between the wires 16 and 18 and between the thicknesses 14a and 14b. This thick band 14c makes it possible for the fabric to withstand a considerable strain without permitting distortion or weakening and since it is approximately equal in thickness to the conductors, it tends to prevent ridges in the fabric where the wires are. On top of the layers 14a and 14b, there may be another layer 14d having an ornamental appearance. The stitching adjacent the wires 16 and 18 is made in such a way as to permit the wires freedom of movement with relation to the outside fabric of the construction in order that the conductor may be turned or twisted without distortion or binding by the wires.

Referring now to Figure 1 it will be noted that the support, denoted generally by the reference numeral 20, is adapted to cooperate with a clamp, denoted generally by the reference numeral 22, to grip the fabric conductor. The support 20 has a curved hook portion 20a which is in extension of a flat body portion 20b which has a central aperture 20c therein through which a wood screw 21 may extend for securing the support to the molding. Above and below the aperture 20c are other apertures 20d which are internally threaded and register with similar apertures 22d in the clamp 22 for securing the clamp and the support together. An extension 20e narrower in width than the body portion 20b of the support depends from the body portion and is offset out of the plane of the body portion in a direction away from the wall in order to pass around and provide room for the junction or connection fitting 24. The lower end of the extension 20e is bent toward the wall and has a foot 20f adapted to lie against the face of the wall in order to position the lower end of the support away from the wall. A screw 23 takes into a hole in the lower end of the extension 20e and is adapted to clamp the fabric of the conductor 14 to the support 20 so that the strain of the fabric will be transmitted directly to the support 20.

Clamp 22 is of equal width to the support 20 and at each side of the upper end of the clamp a lug 22g is turned at right angles to its side portions in a direction to pass through complementary recesses 20g formed in the body portion 20b of the support in order to prevent rotation or sidewise or lengthwise movement of the clamp upon the support. Depending from the central portion of the lower end of the clamp 22 is a tongue 22b in which is a threaded aperture that is adapted to receive a screw 25 passing through the protecting cover 28 to secure the cover in position.

The cover 28 which is preferably molded from insulating material has a flat front face 28a and parallel side walls 28b and an upper end wall 28c perpendicular to the top and sides 28a, 28b. The surfaces of these walls and top and the corners may be suitably curved, rounded or ornamented to give the cover an ornamental appearance. In order that the cover may fit over the molding, weakened sections 28d having an outline as shown in Figure 4 and of less thickness than the rest of the cover are provided in each side wall 28b. These sections may be broken away when this cover is used with the type of fitting just described wherein the molding is above the electric conduit 12. In order that this cover may be adapted for use with the type of support hereinbefore described which is used when the molding is above the conduit other weakened sections 28e in the lower part of the side walls 28b in the casing are provided and may be broken away to accommodate the molding as desired.

It will be recalled that the fabric conductor preferably has an outer fabric covering 14d which possesses an ornamental appearance. In order that this covering may be lead over and secured against the face of the cover a rail 28r is formed at the lower end of the cover. At the upper end of the cover a bail-like member 29 is pivotally mounted in such a way as to have its central portion 29a adjacent to the end wall 28c of the cover in such close proximity that it will clamp the fabric covering 14d to the end wall of the cover when positioned as shown in Figures 9 and 10.

In connecting wires 16 and 18 of the fabric conductor to the wires of the conduit 12 slits are first made in the rear strip 14a of the fabric a short distance from the end in order that the wires 16 and 18 may be pulled through rearwardly. These wires 16 and 18 are then connected to the wires of the conduit 12 with the junction fitting 24 in the manner described in the aforementioned copending application Serial No. 571,962. Then the support 20 is secured to the molding by a wood screw 21. Then the end portion of the fabric is laid upon the central portion 20b of the support 20 and the clamp 22 is laid on top of the fabric and support with lugs 22g in the recesses 20g and the clamp is secured in position by screws passing through the apertures 22d and engaging with the screw threads of the apertures 20d. It will be understood that suitable holes may be punched in the fabric to accommodate the screws which secure the clamp to the support.

Thus the fabric is clamped at its end to the support 20 by means of the clamp 22 and attached to the bottom of the support by the screw 23. At this time, the weakened sections 28d are broken away from the sides of the cover to provide passage for the molding. The cover may then be secured in position over the molding, the support, and the junction fitting 24 by screw 25. In order to position the cover, a hub 25h is formed around the aperture into which the screw 25 fits. This hub engages with the surface of the tongue 22b which it will be noted is offset to a degree approximately equal to the offset of the portion 20e of the support.

In preparing the fabric conductor for connection to the conduit, the ornamental covering 14d of the conductor is torn away from the stitching to an extent sufficient to provide enough of the loose fabric covering to fit around the cover 28. After the cover is secured in position, the ornamental fabric is threaded between the rail 28r and the lower end of the cover and is run over the surface of the cover and beneath the bail-like member 29 whereby the end of the fabric will be held against the upper end surface of the cover.

Referring now to the form of our invention shown in Figures 5, 6, and 7, which is adapted for use in connection with an electric conduit 112 which is positioned above and parallel to the molding 110, the molding and conduit are of the same construction as in the previously described form of the invention. In this form the support designated generallly by the numeral 120 has a hooked portion 120a adapted to be hooked over a picture molding and a flat body portion 120b which is provided with recesses 120g in its side edges for the reception of lugs 22g of a clamp designated generally by a numeral 22. This clamp may be the same as that used in connection with the previously described form of the invention, but in the present case the tongue 22b at the lower end is not used, but arm 22h extending from the central portion of the upper edge of the clamp and not hereinbefore described has an aperture 22j in its end for the reception of a screw 25 by which the cover 28 is secured to the support. It will be noted that the end of the arm 22h is bent to lie parallel with the wall in order that the cover 28 may be positioned with its front face parallel to the wall. The cover 28 is exactly the same as used in the previous form of the invention, since it is one of the objects of our invention to provide a cover which is of general use.

In making the connection of the fabric conductor to the wire conduit 112, the ornamental covering of the fabric is torn away from its stitching so as to be capable of passage around a cover in the manner previously described after the cover is secured in position. The ends of the remaining strips 14a, 14b, and 14c, of the fabric are cut off to expose the wires 16 and 18 sufficiently for them to be connected to the terminals of the junction fitting 24 which in turn are connected to the wires of the conduit 112 in the same manner as in the previously described form of this invention. The ends of the strips 14a, 14b, 14c, are secured between the clamp 22 and the support 120 thereby causing the strain upon the fabric conductor to be transmitted to the picture molding through support 120. In this case as in the previous form of the invention, the support 120 will be secured in a picture molding by a wood screw 21 prior to the securing of the clamp and the fabric to the support. In this form of the invention the weakened portions 28e of the cover will be broken away, instead of the weakened portions 28d, in order to form a passage for the molding 110.

Referring now to the form of the invention shown in Figures 8 and 10, wherein there is no picture molding it will be noted that the support designated generally by the numeral 220 is adapted to be secured beneath the conduit 212. The support 220 comprises a body portion 220b and upper and lower end walls 220a which are bent at right angles to the plane of the body portion toward the wall of the room in order to space the portion 220b away from the wall. The support 220 is secured to the wall of the room by wood screws 21 (only one of which is visible) which pass through the holes 220c in the body portion 220b. The clamp designated generally by the numeral 222 is similar in most respects to the clamp 22 hereinbefore described, and in fact the clamp 22 may be formed from the clamp 222 by an additional stamping operation to bend the tongue 22b and the arm 22h into the desired form for use in connection with the supports 20 and 120. In the present case, however, the arm 222h is a straight extension from the central portion of the clamp 222 and is provided with an internally threaded aperture 222j near its end for the reception of a screw 225 by means of which the cover 28 is secured in position. The cover 28 is the same cover as used in connection with forms of the invention previously described. In making the connection of the fabric conductor to the conduit 12 the same procedure is followed as in the case of the form of the invention shown in Figures 5, 6 and 7, but with the exception that the support 220 is secured to the wall directly instead of to the molding 10. When the cover is used in connection with the form of the invention shown in Figures 8 and 10 it is not necessary to break away either of the weakened sections 28d or 28e.

From the foregoing it will be apparent that we have provided a supporting means for a hanging fabric conductor which is connected to a surface wiring conduit. This supporting means is usable whether the conduit be used above or below a picture molding or whether the conduit be used in a situation where there is no picture molding. It will also be apparent that the cover which we have provided for our supports is adapted for use with any one of the three situations illustratively above mentioned. It will also be apparent that the clamps used with two of the forms of our support are identical and the clamp used with the third form is the same as the clamp used with the other two forms with the exception that one pressing operation is omitted. It will also be apparent that we have provided an effective and ornamental manner of connecting the fabric with the cover to provide a pleasing appearance when the wiring job is completed.

Many modifications within the scope of our invention will occur to those skilled in the art, therefore we do not limit the invention to the precise forms herein illustrated.

We claim:—

1. In a surface wiring system, a fixedly attached supporting member, a clamp attached to said supporting member adapted to clamp between it and the suporting member the fabric of a fabric-type conductor, and a cover fitting over said clamp and supporting member and fixedly attached thereto, said cover being adapted to cover also a connection between the wires of the fabric conductor and the wires of a surface wiring conduit.

2. In a surface wiring system, a fixedly attached supporting member, a clamp attached to said supporting member adapted to clamp between it and the suporting member the fabric of a fabric-type conductor, and a cover fitting over said clamp and supporting member and fixedly attached thereto, said cover being adapted to cover also a connection between the wires of the fabric conductor and the wires of a surface wiring conduit, said cover having means for holding a strip of the fabric conductor across the face of the cover.

3. In a surface wiring system, a fixedly attached supporting member, a clamp attached to said supporting member adapted to clamp between it and the supporting member the fabric of a fabric-type conductor, and a cover fitting over said clamp and supporting member and fixedly attached thereto, said cover being adapted to cover also a connection between the wires of the fabric conductor and the wires of a surface wiring conduit, a bail-like member at one end of the cover and a rail at the other end to hold a strip of fabric across the face of the cover.

4. A cover of molded insulating material adapted to cover the support and connection between an electric surface wiring conduit and a hanging conductor of the type comprising strips of fabric between which parallel conducting wires are loosely held in spaced insulated relation, said cover having weakened sections which are adapted to be broken away to form a passage for a picture molding, and means on said cover to hold a strip of the fabric of said hanging conductor across the face of the cover.

5. In a surface wiring system, a supporting member having a portion formed to engage with a picture molding, a clamping member for securing between it and said supporting member a fabric-type electrical conductor, said clamping member having parallel arched portions forming channels in alignment with the wires of the conductor, said channels being of sufficiently greater radius than the wires of the conductor to avoid clamping action on said wires, said clamping member having portions parallel to portions of said support whereby the fabric of the conductor can be clamped immovably between said clamping member and supporting member.

6. In a surface wiring system, a fixedly mounted supporting member, a clamp adapted to clamp between itself and said supporting member a fabric conductor, said clamp having lugs and said supporting member having recesses for said lugs whereby the clamp is held against sidewise and lengthwise movement relative to said supporting member, said clamp having parallel arched portions forming channels in alignment with the wires of said conductor, and means on said clamp for supporting a cover.

7. In a surface wiring system, a fixedly mounted supporting member, a clamp adapted to clamp between itself and said supporting member a fabric conductor, said clamp having lugs and said supporting member having recesses for said lugs whereby the clamp is held against sidewise and lengthwise movement relative to said supporting member, said clamp having parallel arched portions forming channels in alignment with the wires of said conductor, and means on said clamp for supporting a cover, and a cover secured to said means and adapted to cover said clamp and supporting member and also to cover a connection between said conductor and a surface wiring conduit.

8. In a surface wiring system, a supporting member having a portion for connection to a picture molding and an offset portion providing space between itself and the wall of a room for a connection between a fabric-type hanging conductor and a surface wiring conduit, the end of said offset portion being bent into contact with the wall of the room for spacing said offset portion from the wall, and a clamp for securing a fabric-type conductor between said supporting member and clamp.

9. In a surface wiring system, a supporting member having a portion for connection to a picture molding and an offset portion providing space between itself and the wall of a room for a connection between a fabric-type hanging conductor and a surface wiring conduit, the end of said offset portion being bent into contact with the wall of the room for spacing said offset portion from the wall, and a clamp for securing a fabric-type conductor between said supporting member and clamp, said clamp being provided with means to support a cover, and a cover housing said clamp and supporting member and also housing the connection between the fabric conductor and conduit.

10. In a surface wiring system, a supporting member having a portion for connection to a picture molding and an offset portion providing space between itself and the wall of a room for a connection between a fabric-type hanging conductor and a surface wiring conduit, the end of said offset portion being bent into contact with the wall of the room for spacing said offset portion from the wall, and a clamp for securing a fabric-type conductor between said supporting member and clamp, said clamp being provided with means to support a cover, and a cover housing said clamp and supporting member and also housing the connection between the fabric conductor and conduit, said cover having weakened sections adapted to be removed to form a passage for a picture molding whether the molding be above or below the wiring conduit.

11. In a surface wiring system, a supporting member, means for securing said member adjacent a wall, a clamp for securing between itself and said member a fabric-type hanging conductor, said clamp being provided with means to support a cover, and a cover housing said clamp and supporting member and also housing the connection between the fabric conductor and conduit.

12. In a surface wiring system, a supporting member, means for securing said member adjacent a wall, a clamp for securing between itself and said member a fabric type hanging conductor, said clamp being provided with means to support a cover, and a cover housing said clamp and supporting member and also housing the connection between the fabric conductor and conduit, said clamp having parallel arched portions forming channels in alignment with the wires of the conduits.

13. In a surface wiring system, supporting means adapted to be secured to a picture molding for supporting a fabric type of conductor which is connected to a wiring conduit, clamping means adapted to clamp the fabric conductor to said support whether the conduit is above or below the molding, and a cover adapted to cover said clamping and supporting means and also to cover the connection between the conduit and fabric conductor whether the conduit is above or below the molding.

14. In a surface wiring system, supporting means adapted to be secured to a picture molding for supporting a fabric type of conductor which is connected to a wiring conduit, clamping means adapted to clamp the fabric conductor to said support whether the conduit is above or below the molding, and a cover adapted to cover said clamping and supporting means and also to cover the connection between the conduit and fabric conductor whether the conduit is above or below the molding, and a plurality of sections in said cover removable to form a passage for the molding whether it be above or below the conduit.

CHARLES W. ABBOTT.
GEORGE A. JOHNSON.